United States Patent [19]
Martin et al.

[11] 3,812,249
[45] May 21, 1974

[54] ANTIBIOTIC BL580

[75] Inventors: John Henry Edward James Martin, New York, N.Y.; Sidney Kantor, Lawrence Township, N.J.

[73] Assignee: American Cyanamid Company, Stamford, Conn.

[22] Filed: Nov. 24, 1972

[21] Appl. No.: 309,383

[52] U.S. Cl................ 424/121, 424/122, 195/80
[51] Int. Cl............................................. A61l 21/00
[58] Field of Search ............. 424/121, 122; 195/80

[56] References Cited
UNITED STATES PATENTS
3,595,955   7/1971   Boer et al. ........................ 424/121
3,699,223   10/1972   Bergy et al. ...................... 424/121

*Primary Examiner*—Jerome D. Goldberg
*Attorney, Agent, or Firm*—Edward Conroy, Jr.

[57] ABSTRACT

This disclosure describes two new antibiotics, designated BL580α and BL580β, produced in a microbiological fermentation under controlled conditions using a new strain of *Streptomyces hygroscopicus* and mutants thereof. The new antibiotics are active antimalarial and anticoccidial agents.

4 Claims, 2 Drawing Figures

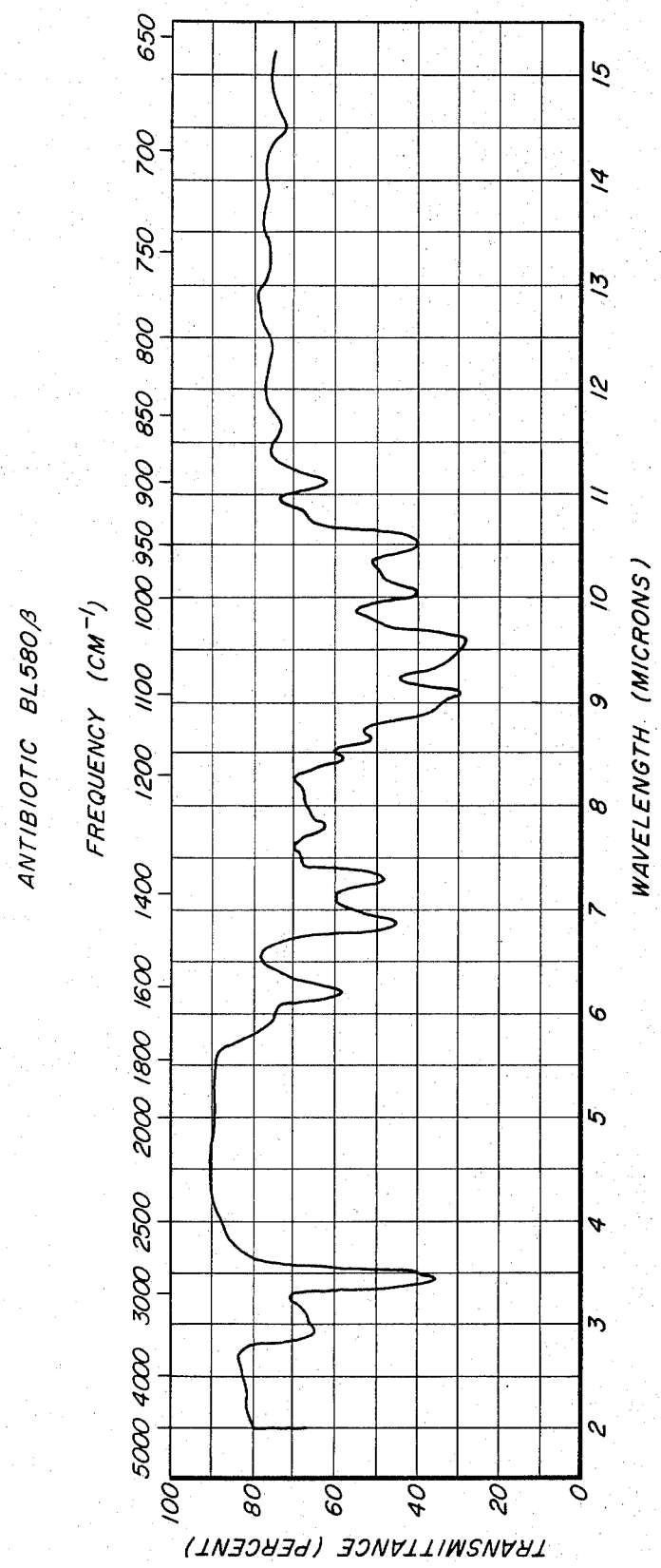

ANTIBIOTIC BL580

BRIEF SUMMARY OF THE INVENTION

This invention relates to two new antibiotics, to their production by fermentation, to methods for their recovery and concentration from crude solutions, and to processes for their purification. The present invention includes within its scope the antibiotics in dilute form, crude concentrates, and in pure crystalline form. The effects of the new antibiotics on specific organisms, together with their chemical and physical properties, differentiate them from previously described antibacterial agents.

DETAILED DESCRIPTION OF THE INVENTION

Figure 1:
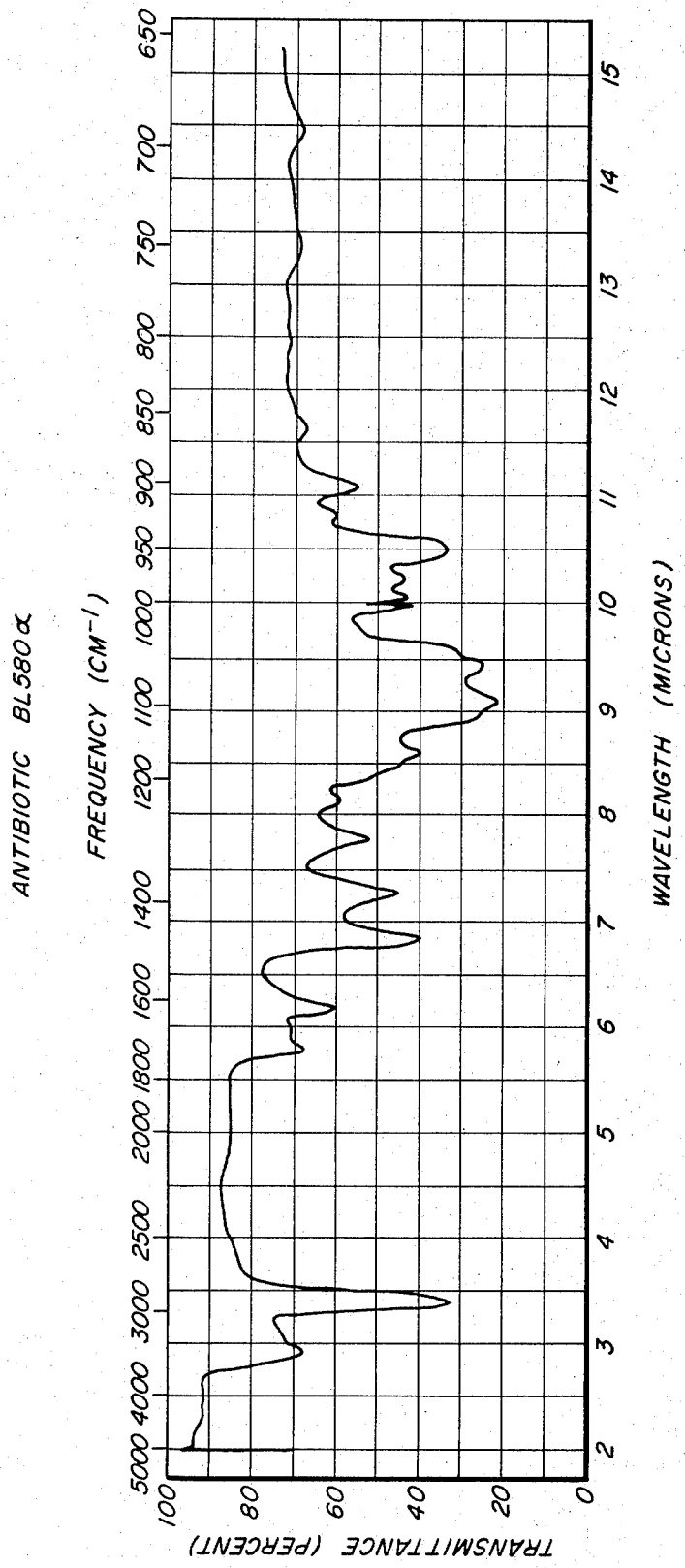

The new antibiotics which we have designated BL580α, and BL580β are formed during the cultivation under controlled conditions of a new strain of *Streptomyces hygroscopicus*. This new antibiotic producing strain was isolated from a soil sample collected in Iowa. A viable culture of the new microorganism has been deposited with the Culture Collection Laboratory, Northern Utilization Research and Development Division, United States Department of Agriculture, Peoria, Illinois, and has been added to its permanent collection. It is freely available to the public in this depository under its accession number NRRL 5647.

The description and identification of this new microorganism, maintained in the culture collection of the Lederle Laboratories Division, American Cyanamid Company, Pearl River, N.Y. as Culture No. BL580, was supplied by Dr. H. D. Tresner of these laboratories. The following is a general description of the microorganism *Streptomyces hygroscopicus* NRRL 5647, based on diagnostic characteristics observed. Observations were made of the cultural, physiological, and morphological features of the microorganism in accordance with the methods detailed by Shirling and Gottlieb, Internat. Journ. of Syst. Bacetiol. 16:313-340 (1966). The underscored descriptive colors and color chip designations are taken from Jacobson et al., Color Harmony Manual, 3rd edit (1948), Container Corp. of America, Chicago, Illinois. Descriptive details are recorded in Tables I through IV below.

Amount of Growth

Good on yeast extract, Kuster's oatflake, tomato paste-oatmeal and potato-dextrose agars; moderate on asparagine-dextrose, Hickey and Tresner's inorganic salts-starch and Bennett's agars; light on Czapek's solution agar.

Aerial Mycelium

Aerial Mycelium whitish to yellowish, becoming grayish in sporulation zones ranging from Fawn (4 ig) to Beaver (4 li) to Ashes (5 fe). Sporulation zones becoming black and hygroscopic in older cultures.

Soluble Pigments

None on most media; yellowish on yeast extract, Bennett's and potato-dextrose agars and only in light amounts.

Reverse Color

Generally in yellowish shades on most media.

Miscellaneous Physiological Reactions

Nitrates reduced to nitrites; complete liquefaction of gelatin; no formation of melanoid pigments on peptone-iron agar; complete petonization of purple milk in 7 days; tolerance of NaCl in growth medium, ≧ 7 percent but <10 percent. Carbon source utilization according to the method of Pridham and Gottlieb, J. Bacteriol. 56:107-114(1948) as follows: Good utilization of adonitol, g-galactose, d-fructose, d-raffinose, salicin, d-xylose and dextrose; poor or no utilization of d-melezitose, d-melibiose, l-arabinose, i-inositol, lactose, d-mannitol, l-rahmnose, sucrose and d-trehalose.

Micromorphology

Aerial mycelium gives rise to spore-bearing branches which terminate in tightly coiled spirals of several turns; spores are mostly isodiametric, cylindrical, phalangiform, 0.6–0.7 $\mu$m × 0.7–0.8 $\mu$m. Spores smooth as determined by electron microscopy; spore sheaths finely wrinkled.

On the basis of the general characteristics observed, microorganism BL580 is a member of a large group of steptomycetes characterized by gray spores, spiral spore chains, smooth-walled spores and lack of melanin pigments. The hygroscopic nature of the culture along with its entire composite of morphological and physiological characteristics makes it a representative strain of *Streptomyces hygroscopicus* as defined by H. D. Tresner and E. J. Backus, "A Broadened Concept of the Characteristics of Streptomyces hygroscopicus," Appl. Microbiol., 4:243-250 (1956) and H. D. Tresner, E. J. Backus and J. A. Hayes, "Morphological Spore Types in the *Streptomyces hygroscopicus*-like Complex," Appl. Microbiol., 15:637-639 (1967).

TABLE I

Cultural Characteristics of *Streptomyces hygroscopicus* NRRL 5647
Incubation: 14 days Temperature: 28°C.

| Medium | Amount of Growth | Aerial Mycelium and/or Spores | Soluble Pigment | Reverse Color | Remarks |
| --- | --- | --- | --- | --- | --- |
| Czapek's solution agar | Light | Trace of whitish aerial mycelium; no sporulation. | None | Colorless to whitish | |
| Yeast extract agar | Good | Aerial mycelium whitish, becoming Fawn (4 ig) to Beaver (4 li) in sporulation zones. Sporulation heavy. | Yellowish, light | Bamboo (2 fb) | Blackish hygroscopic areas in central colony zones. |
| Kuster's oat flake agar | Good | Aerial mycelium whitish, becoming Fawn (4 ig) to Beaver (4 li) in sporulation zones. Sporulation heavy. | None | Lt. mustard tan (2 ie) | Blackish hygroscopic areas in central colony zones. Yellowish exudate in marginal zones. |
| Asparagine-dextrose agar | Moderate | Aerial mycelium whitish, becoming Ashes (5 fe) to Fawn (4 ig) in sporulation areas. Sporulation moderate. | None | Bamboo (2 fb) | Blackish hygroscopic areas in central colony zones. |

TABLE I—Continued

Cultural Characteristics of *Streptomyces hygroscopicus* NRRL 5647
Incubation: 14 days Temperature: 28°C.

| Medium | Amount of Growth | Aerial Mycelium and/or Spores | Soluble Pigment | Reverse Color | Remarks |
|---|---|---|---|---|---|
| Hickey and Tresner's agar | Moderate | Aerial mycelium whitish to yellowish, becoming Fawn (4 ig) to Beaver (4 li) in sporulation zones. Sporulation heavy. | None | Bamboo (2 fb) | Extensive hygroscopic areas in central colony zones. |
| Inorganic salts-starch agar | Moderate | Aerial mycelium whitish to yellowish, becoming Fawn (4 ig) to Beaver (4 li) in sporulation zones. Sporulation heavy. | None | Pastel yellow (1 db) | Blackish hygroscopic areas in central colony zones. |
| Tomato paste-oatmeal agar | Good | Aerial mycelium whitish to yellowish, becoming Fawn (4 ig) to Beaver (4 li) in sporulation zones. Sporulation very heavy. | None | Yellow Maple (3 ng) | Extensive hygroscopic areas in central colony zones. Yellowish exudate in marginal zones. |
| Bennett's agar | Moderate | Aerial mycelium whitish, becoming Beaver (4 li) in sporulation zones. Sporulation heavy | Yellowish, light | Bamboo (2 fb) | Blackish hygroscopic areas in central colony zones. |
| Potato-dextrose agar. | Good | Aerial mycelium whitish to yellowish, becoming Ashes (5 fe) to Fawn (4 ig) in sporulation zones. Sporulation moderate. | Yellowish, light | Yellow Maple (3 ng) | Blackish hygroscopic areas in central colony zones. |

TABLE II

Micromorphology of *Streptomyces hygroscopicus* NNRL 5647

| Medium | Aerial Mycelium and/or Sporiferous Structures | Spore Shape | Spore Size | Spore Surface |
|---|---|---|---|---|
| Kuster's Oatflake agar | Aerial Mycelium gives rise to spore bearing branches which terminate in tightly coiled spirals of several turns. | Spores are mostly isodiametric, cyclindrical, phalangiform. | 0.6–0.7 $\mu$m × 0.7–0.8 $\mu$m | Smooth as determined by electron microscopy. Spore sheaths finely wrinkled. |

TABLE III

Miscellaneous Physiological Reaction of *Streptomyces hygroscopicus* NRRL 5647
Temperature: 28°C.

| Medium | Incubation Period | Amount of Growth | Physiological Reaction |
|---|---|---|---|
| Organic Nitrate Broth | 7 days | Good | Nitrates reduced to nitrites |
| Organic Nitrate Broth | 14 days | Good | Nitrates reduced to nitrites |
| Gelatin | 7 days | Good | Complete liquefaction |
| Peptone-iron Agar | 24–48 hours | Good | No melanoid pigments produced |
| Purple milk | 7 days | Good | Complete peptonization |
| Yeast extract agar plus (4, 7, 10 and 13%) NaCl | 10 days | Good | NaCl tolerance 7% but <10% |

TABLE IV

Carbon Source Utilization Pattern of *Streptomyces hygroscopicus* NRRL 5647

| Carbon Source | Utilization* |
|---|---|
| Adonitol | 3 |
| *l*-Arabinose | 0 |
| Dextran | 3 |
| *d*-Fructose | 3 |
| *i*-Inositol | 0 |
| Lactose | 0 |
| *d*-Mannitol | 0 |
| *d*-Melezitose | 1 |
| *d*-Melibiose | 1 |
| *d*-Raffinose | 3 |
| *l*-Rhamnose | 0 |
| Salicin | 3 |
| Sucrose | 0 |
| *d*-Trehalose | 0 |
| *d*-Xylose | 3 |
| Dextrose | 3 |
| Negative Control | 0 |

*
3- Good Utilization
2- Fair Utilization
1- Poor Utilization
0- No Utilization

It is to be understood that for the production of the new antibiotics the present invention is not limited to this particular microorganism or to microorganisms fully answering the above growth and microscopic characteristics which are given for illustrative purposes. In fact, it is desired and intended to include the use of mutants produced from the described microorganism by various means, such as X-radiation, ultraviolet radiation, nitrogen mustard, phage exposure, and the like.

THE FERMENTATION PROCESS

Cultivation of the microorganism *Streptomyces hygroscopicus* NRRL 5647 may be carried out in a wide variety of liquid culture media. Media which are useful for the production of the novel antibiotics BL580α and BL580β include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chloride, etc. Trace elements such as boron, molybdenum, copper, etc. are supplied as impurities of other constituents of the media. Aeration in tanks and bottles is provided by forcing sterile air through or onto the surface of the fermenting medium. Further agitation in tanks is provided by a mechanical impeller. An antifoaming agent such as 1 percent octadecanol in lard oil may be added as needed.

INOCULUM PREPARATION

Shaker flask inoculum of *Streptomyces hygroscopicus* NRRL 5647 is prepared by inoculating 100 ml. of sterile liquid medium in 500 ml. flasks with scrapings or washings of spores from an agar slant of the culture. The following medium is ordinarily used:

| | |
|---|---|
| Glucose | 20 gm. |
| Soy flour | 10 gm. |
| Corn steep liquor | 5 gm. |
| Calcium carbonate | 3 gm. |
| Water to | 1000 ml. |

The flasks are incubated at a temperature from 25° to 29°C., preferably 28°C., and agitated vigorously on a rotary shaker for 30 to 48 hours. These 100 ml. portions of inocula are used to inoculate one liter and 12 liter batches of the same medium in 2 liter and 20 liter glass fermentors. The inoculum mash is aerated with sterile air while growth is continued for 30 to 48 hours. These batches of inocula are used to inoculate tank fermentors.

TANK FERMENTATION

For the production of antibiotics BL580α and BL580β in tank fermentors the following fermentation medium is preferably used.

| | |
|---|---|
| Cornstarch | 40 gm. |
| Soy flour | 10 gm. |
| Corn steep liquor | 5 gm. |
| Calcium carbonate | 3 gm. |
| Water to | 1000 ml. |

Each tank is inoculated with 3 to 10 percent of inoculum made as described above. Aeration is supplied at the rate of 0.5 to 1.0 liter of sterile air per liter of broth per minute and the fermentation mixture is agitated by an impeller driven at 200–400 r.p.m. The temperature is maintained at 25° to 29°C., usually at 28°C. The fermentation is ordinarily continued for 90 to 120 hours, at which time the mash is harvested.

PURIFICATION PROCEDURE

After the fermentation is completed, the fermented mash containing the antibiotics of this invention is filtered using diatomaceous earth as a filter aid. The filter cake is washed with water. The combined filtrate and washings are stirred with ethyl acetate and the mixture is allowed to settle. The phases are separated. The ethyl acetate phase is concentrated in a still and then allowed to evaporate to an oily residue.

Silica gel is slurried in methylene chloride and the suspension is poured into a glass column. The excess solvent is allowed to drain away. The crude oily residue from the ethyl acetate extraction is dissolved in a minimal quantity of methylene chloride and allowed to seep into the column gel. The column is treated with methylene chloride followed by methylene chloride-ethyl acetate (1:1 v/v). A total of 49 volumes (75 ml. per volume) is collected. A separate paper (one-fourth inch diameter) is dipped into each fraction, air dried and bioautographed on an agar plate seeded with *Streptococcus pyogenes* NY5. Fractions 7 to 37, comprising the active band, are combined and concentrated to a residue.

A two-phase system is prepared by mixing hexane:ethyl acetate: methanol:water (28:2:16:1). Acid washed diatomaceous earth is wetted with a portion of the aqueous phase and packed in increments into a glass column. The charge consists of a mixture of diatomaceous earth, lower phase and partially purified residue from the silica gel chromatography. The column is developed with the upper phase of the system. Fractions of 20 ml. each are collected. The active fractions are determined as described above. Fractions 4 to 14 inclusive, containing BL580α are combined and concentrated to a residue. Similarly, fractions 24 to 65, comprising BL580β are concentrated to a residue. Amorphous, essentially pure BL580α may be obtained from the above BL580α residue from a partition column by solvent countercurrent distribution using a system composed of hexane:ethyl acetate:methanol:water (56:12:32:3). Amorphous, essentially pure BL580β may be obtained by subjecting the BL580β band from a partition column to solvent countercurrent distribution using hexane:ethyl acetate: methanol water (280:70:160:7).

Antibiotics BL580α and BL580β exhibit antimicrobial activity against *Streptococcus pyrognes* NY5 at a concentration of 2.5 mcg./ml. when assayed by conventional agar dilution techniques.

The usefulness of these new antibiotics is demonstrated by their ability to control systemic lethal infections in mice. Both BL580α and BL580β exhibited in vivo antimalarial activity in mice against *Plasmodium berghei* according to the following test. Carworth Farms CF–1 mice were inoculated with 1–2 million parasitized (*Plasmodium berghei*) red cells per mouse, randomized and caged in groups of 5 to 10 mice. Drug-diet treatment was initiated within 1–3 hours post-inoculation and was continued for 6 successive days (day 0–5 postinoculation). Appropriate groups of untreated controls, both infected and uninfected, were included and appropriate infected controls, treated with chloroquine or pyrimethamine, were also included. Determination of group (i.e. mean) mouse weights were made on the day of inoculation and on days 3 and 6 postinoculation. The food was weighed before and immediately after the treatment period and mean daily intakes of the compounds were determined. Geimsa-stained thin blood films were prepared once from 3–10 mice in each treated group on day 7–12 postinoculation and the mean parasitemia was compared with that of appropriate untreated controls. Mortality was recorded daily, with an observation period of at least 30 days postinoculation. Median survival times were determined by inspection. The results of such a test conducted using BL580α and BL580β appear in Table V below.

TABLE V

| × 6 days | % in Diet mg./kg./day | Dose Day 8 | % Parasite Suppression (treated/controls) | Median survival time in days Compound |
|---|---|---|---|---|
| BL580α | 0.1 | 190 | 83** | 15/9 |
| BL580β | 0.1 | 209 | 50* | 12/9 |
| BL580α | 0.37 | 673 | 99** | 12/9 |
| BL580β | 0.2 | 350 | 65* | 15/9 |

\* Indicates possible suppression antimalarial activity
\*\* Indicates suppressive antimalarial activity.

The usefulness of BL580α and BL580β is further demonstrated by their *in vivo* anticoccidial activity in chickens according to the following test.

The poultry diet employed in the test is as follows:

| | |
|---|---|
| Vitamin-amino acid premix | 0.5% |
| Trace minerals | 0.1% |
| Sodium chloride | 0.3% |
| Dicalcium phosphate | 1.2% |
| Ground limestone | 0.5% |
| Stabilized fat | 4.0% |
| Dehydrated alfalfa, 17% protein | 2.0% |
| Corn gluten meal, 41% protein | 5.0% |
| Menhaden fish meal, 60% protein | 5.0% |
| Soybean oil meal, 44% protein | 30.0% |
| Ground yellow corn, fine to | 100% |

The vitamin-amino acid premix in the above feed composition is prepared from the following formulation. The expressions of quantity relate to units per kilogram of the finished feed composition.

| | |
|---|---|
| Butylated hydroxy toluene | 125 mg. |
| dl-Methionine | 500 mg. |
| Vitamin A | 3300 I.U. |
| Vitamin D$_3$ | 1100 I.C.U. |
| Riboflavin | 4.4 mg. |
| Vitamin E | 2.2 I.U. |
| Niacin | 27.5 mg. |
| Panthothenic acid | 8.8 mg. |
| Choline chlorde | 500 mg. |
| Folic acid | 1.43 mg. |
| Menadione sodium bisulfate | 1.1 mg. |
| Vitamin B$_{12}$ | 11 mcg. |
| Ground yellow corn, fine to | 5 gm. |

A mixed inoculum of 5000 sporulated oocysts of *Eimeria acervulina* and a sufficient number of oocysts of *Eimeria tenella* to produce 85 percent to 100 percent mortality in untreated controls was given to seven-day-old chicks, by direct inoculation into the crops of all chicks. The chicks were given free access to feed and water during the entire test period. Two days before inoculation, medicated feed with several levels of drug was presented to the various groups of chicks. Seven days after inoculation the tests were terminated and the birds were weighed, necropsied and their intestinal tracts examined for lesions. The results appear in Table VI below. These results show that 100 percent survival of infected chicks is obtained when 100 ppm. of BL580α and 125 ppm. or 250 ppm. of BL580β is administered to infected chicks in their diet. These levels also show a significant suppression of lesions due to *E. tenella* and *E. acervulina*.

The invention will be described in greater detail in conjunction with the following specific examples.

EXAMPLE 1

Inoculum Preparation

A typical medium used to grow the primary inoculum was prepared according to the following formula:

| | |
|---|---|
| Glucose | 20 gm. |
| Soy flour | 10 gm. |
| Corn steep liquor | 5 gm. |
| Calcium carbonate | 3 gm. |
| Water to | 1000 ml. |

The washed or scraped spores from an agar slant of *Streptomyces hygroscopicus* NRRL 5647 were used to inoculate two 500 ml. flasks containing 100 ml. each of the above sterile medium. The flasks were placed on a rotary shaker and agitated vigorously for 48 hours at 28°C. The resulting flask inoculum was transferred to a 5 gallon glass fermentor containing 12 liters of the same sterile medium. The glass fermentor was aerated with sterile air while growth was carried out for about 48 hours, after which the contents were used to seed a 300 liter tank fermentor.

EXAMPLE 2

Fermentation

A fermentation medium was prepared according to the following formula:

| | |
|---|---|
| Cornstarch | 40 gm. |
| Soy flour | 10 gm. |
| Corn steep liquor | 5 gm. |
| Calcium carbonate | 3 gm. |
| Water to | 1000 ml. |

The fermentation medium was sterilized at 120°C. with steam at 20 lbs. pressure for 90 minutes. The pH of the medium after sterilization was 6.5. Three hundred liters of this sterile medium in a 400 liter tank fermentor was inoculated with 12 liters of inoculum prepared as described in Example 1. The fermentation was carried out at 28°C. using Hodag LG-8 oil as a defoaming agent. Aeration was supplied at the rate of 0.5 liter of sterile air per liter of mash per minute. The mash was

TABLE VI

| Concentration in diet ppm. | No. of Birds Started | % Survival | % Birds with Reduced Lesions E. tenella | E. acervulina |
|---|---|---|---|---|
| BL580β | | | | |
| Uninfected | 0 | 40 | 100 | — | — |
| Infected | 0 | 40 | 32 | 0 | 0 |
| | 250 | 5 | 100 | 80 | 100 |
| | 125 | 5 | 100 | 40 | 100 |
| BL580α | | | | |
| Uninfected | 0 | 20 | 100 | — | — |
| Infected | 0 | 20 | 25 | 0 | 0 |
| | 100 | 5 | 100 | 80 | 100 | agitated by an impeller driven at 200 r.p.m. At the end of about 116 hours of fermentation time the mash was harvested.

EXAMPLE 3

Isolation and Purification

A 300 liter portion of fermented mash, prepared as described in Example 2, having a pH of 7.1 was filtered with the aid of diatomaceous earth. The filter cake was washed with 30 liters of tap water. The combined filtrate and washings consisting of about 260 liters was stirred with 130 liters of ethyl acetate for 20 minutes. The mixture was allowed to settle, the phases were separated and the 125 liters ethyl acetate phase was concentrated in a still at reduced pressure to 3.2 liters which was then allowed to evaporate to an oily residue.

A 300 gm. portion of silica gel (Davison Chemical Company, Grade No. 62) was slurried in methylene chloride and the suspension was poured into a 2 ½ inches diameter glass column. The excess solvent was allowed to drain away. The crude oily residue from the ethyl acetate extraction was dissolved in a minimal quantity of methylene chloride and allowed to seep into the column of gel. The column was treated with 2,475 ml. of methylene chloride followed by 1,200 ml. of a methylene chloride-ethyl acetate (1:1 v/v) mixture. A total of 49 fractions with a volume of 75 ml. each were collected. A separate paper disc (one-fourth inch diameter) was dipped into each fraction, air dried and bioautographed on a large agar plate seeded with *Streptococcus pyogenes* NY5. Fractions 7 to 37, comprising the active band, were combined and concentrated to a residue weighing 7.08 gm.

A two-phase system was prepared by mixing hexane:ethyl acetate:methanol:water (28:2:16:1). A 160 gm. portion of acid-washed diatomaceous earth was wetted with 120 ml. of the aqueous phase and this was packed in increments into a glass column 1 ¼ inch in diameter. The charge consisted of a mixture of 16 gm. diatomaceous earth, 12 ml. of lower phase and the 7.08 gm. of partially purified product from the silica gel chromatography. The column was developed with upper phase. Fractions of 20 ml. each were collected using an automatic collector. The active components were detected by chromatography on thin layer chromatography plates [Silica gel F-254, Merck AG-Darmstadt (Germany)] using chloroform-ethyl acetate (1:1 v/v) as a developing solvent. The zones were detected by first spraying with sulfuric acid followed by heating on a hot plate. The active components appeared as black zones with Rf values of 0.44 (BL580α) and 0.27 (BL580β). Fractions 4 to 14 incusive, containing BL580α, were combined and concentrated to a residue weighing 799 mg. Similarly, fractions 24 to 65, comprising BL580β, were concentrated to a residue weighing 1,130 mg.

EXAMPLE 4

Preparation of Highly Purified BL580α

Amorphous, essentially pure BL580α was obtained from material prepared as described in Example 3 (fractions 4–14) from a partition column by solvent countercurrent distribution using a system composed of hexane:ethyl acetate:methanol:water (56:12:32:3 by volume). The countercurrent distribution was conducted in a 200-tube apparatus using 10 ml. of lower phase and 10 ml. of upper phase per tube. The charge consisting of 999 mg. was dissolved in 40 ml. of lower phase and transferred into tubes 1 to 4. The apparatus was run for 190 transfers. BL580α was found in tubes 60 to 100 by thin layer chromatography. The contents of tubes 60–100 were combined and concentrated to an aqueous suspension containing a white precipitate. The precipitate was collected on a funnel, washed with water and dried in vacuo over $P_2O_5$ at room temperature yielding 348 mg. of BL580α. Elemental analysis: C, 62.05; H, 8.86; N, 0.00; O(direct), 24.75; Ash, 5.90. Molecular Weight (isothermal distillation in $CHCl_3$): 711. Specific Rotation: $[\alpha]_D^{25°} = 15.55° \pm 0.18$ ($C = 1.08$ in methanol). A standard infrared absorption spectrum of BL580α prepared in a KBr pellet is shown in FIG. 1 of the accompanying drawings.

EXAMPLE 5

Preparation of Highly Purified BL580β

Amorphous, essentially pure BL580β was obtained from material prepared as described in Example 3 (fractions 24–65) from a partition column by solvent countercurrent distribution using hexane:ethyl acetate:methanol:water (280:70:160:7 by volume). The countercurrent distribution was conducted as described in Example 4 using 240 transfers and a charge of 1.3 gm. Fractions 55 to 90, containing BL580β gave 862 mg. of a white amorphous solid upon concentration, lyophilization in t-butanol, and drying in vacuo over $P_2O_5$ at room temperature. Elemental analysis: C, 60.74; H, 8.73; N, 0.00; O (direct), 22.71; Ash, 5.60. Molecular Weight (isothermal distillation in $CHCl_3$): 641. Specific rotation: $[\alpha]_D^{25°} = 0 \pm 0.2°$ ($C = 0.902$ in methanol) and $[\alpha]_D^{25°} = 1.06 \pm 0.2°$ ($C = 0.942$ in chlorform). A standard infrared absorption spectrum of BL580β prepared in a KBr pellet is shown in FIG. 2 of the accompanying drawings.

We claim:
1. Antibiotic BL580α, a compound which
   a. is effective in inhibiting the growth of bacteria; and in its essentially pure crystalline form
   b. has an optical rotation $[\alpha]_D^{25°} = 15.55° \pm 0.18°$ ($C=1.08$ in methanol);
   c. has the following elemental analysis (percent): C,62.05; H,8.86; O,24.75; ash, 5.90;
   d. has a molecular weight of 711 as measured by isothermal distillation in chloroform; and
   e. has a characteristic infrared absorption spectrum as shown in FIG. 1 of the drawings.
2. A compound as defined in claim 1, antibiotic BL580α, in its essentially pure form.
3. Antibiotic BL580β, a compound which
   a. is effective in inhibiting the growth of bacteria; and in its essentially pure crystalline form;
   b. has an optical rotation $[\alpha]_D^{25°} = 1.06° \pm 0.2°$ ($C=0.942$ in chloroform);
   c. has the following elemental analysis (percent): C,60.74; H, 8.73; O,22.71; ash, 5.60;
   d. has a molecular weight of 641 as measured by isothermal distillation in chloroform; and
   e. has a characteristic infrared absorption spectrum as shown in FIG. 2 of the drawings.
4. A compound as defined in claim 3, antibiotic BL580β, in its essentially pure form.

* * * * *